US011250431B2

(12) United States Patent
Gerard et al.

(10) Patent No.: US 11,250,431 B2
(45) Date of Patent: Feb. 15, 2022

(54) SYSTEMS AND METHODS FOR ENHANCED FRAUD DETECTION BASED ON TRANSACTIONS AT POTENTIALLY COMPROMISED LOCATIONS

(71) Applicant: MasterCard International Incorporated, Purchase, NY (US)

(72) Inventors: Jean-Pierre Gerard, Croton-on-Hudson, NY (US); Po Hu, Norwalk, CT (US); Qian Wang, Ridgefield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 717 days.

(21) Appl. No.: 14/605,443

(22) Filed: Jan. 26, 2015

(65) Prior Publication Data
US 2016/0217470 A1   Jul. 28, 2016

(51) Int. Cl.
*G06Q 20/40* (2012.01)
*G06Q 20/10* (2012.01)

(52) U.S. Cl.
CPC ..... *G06Q 20/4016* (2013.01); *G06Q 20/1085* (2013.01)

(58) Field of Classification Search
CPC .......... G06Q 30/0185; G06Q 20/4093; G06Q 20/4016
USPC ......................................................... 705/44
See application file for complete search history.

(56) References Cited

U.S. PATENT DOCUMENTS

| 8,386,381 | B1 | 2/2013 | Barton et al. |
| 8,458,069 | B2 | 6/2013 | Adjaoute |
| 8,473,415 | B2 | 6/2013 | Siegel et al. |
| 8,600,872 | B1 | 12/2013 | Yan |
| 8,799,122 | B1 | 8/2014 | Del Favero et al. |

(Continued)

OTHER PUBLICATIONS

"Blackbaud Merchant Services Fraud Management Risk Score Factors", How Blackbaud Merchant Services Determines the Risk for Fraud, Sep. 2012.*

(Continued)

*Primary Examiner* — Hai Tran
(74) *Attorney, Agent, or Firm* — Armstrong Teasdale LLP

(57) ABSTRACT

A computer-implemented method for enhancing fraud detection based on transactions at potentially compromised locations is provided. The method includes determining a list of potentially compromised transaction locations, storing the list of potentially compromised transaction locations, and receiving from a first transaction location a first authorization request message for a first transaction. The first authorization request message is associated with a first payment account. The method also includes determining the first transaction location based on the first authorization request message, determining if the first transaction location is in the list of potentially compromised transaction locations, and if the determination is that the first transaction location is included in the list of potentially compromised transaction locations, flagging the first payment account as potentially compromised so that a fraud score for a future transaction is associated with the first payment account is adjusted based on the potentially compromised flag.

17 Claims, 8 Drawing Sheets

(56) References Cited

U.S. PATENT DOCUMENTS

| | | | | |
|---|---|---|---|---|
| 2002/0139837 A1* | 10/2002 | Spitz | ................... | G06Q 20/10 |
| | | | | 235/375 |
| 2003/0187783 A1* | 10/2003 | Arthus | ................ | G06Q 20/10 |
| | | | | 705/39 |
| 2004/0034604 A1* | 2/2004 | Klebanoff | ............ | G06Q 20/10 |
| | | | | 705/65 |
| 2008/0172316 A1 | 7/2008 | Adams | | |
| 2010/0169192 A1* | 7/2010 | Zoldi | ................... | G06Q 40/12 |
| | | | | 705/30 |
| 2014/0122325 A1* | 5/2014 | Zoldi | ............... | G06Q 20/4016 |
| | | | | 705/39 |
| 2014/0249934 A1 | 9/2014 | Subramanian et al. | | |
| 2016/0110709 A1* | 4/2016 | Lacoss-Arnold | ...... | G06Q 20/34 |
| | | | | 705/75 |

OTHER PUBLICATIONS

Dialog NPL Search Report1, Listing, date Sep. 29, 2021 (Year: 2021).*

Dialog NPL Search Report2, "Reducing Fraud Risks In E-Banking", Publication Info: Pakistan & Gulf Economist 30.18/19: 134-135. AsiaNet Pakistan (Pvt) Ltd. (May 2011). (Year: 2011).*

\* cited by examiner

SYSTEMS AND METHODS FOR ENHANCED FRAUD DETECTION BASED ON TRANSACTIONS AT POTENTIALLY COMPROMISED LOCATIONS

BACKGROUND OF THE DISCLOSURE

The field of the disclosure relates generally to enhancing fraud detection, and more specifically to methods and systems for detecting potentially compromised locations and updating the fraud scoring of payment cards that conduct transactions at those potentially compromised locations.

Many online merchants store payment card information, including payment card numbers, for their returning customers, to process returns, and for purchase trend research. This payment card information may include other cardholder identifying information. In many cases, this information is stored for processing recurring transactions or to improve the speed of the checkout process for future online transactions. The stored payment card information allows a customer to avoid having to re-enter his or her payment card information every time the customer makes an online purchase from the merchant. However, this payment card information has the potential to be stolen. Over the past several years, many cases of security breaches, also known as account data compromises, have been reported. While some breaches have been for a few payment cards, other breaches have affected millions of payment cards. The stolen payment card information may then be used to perform fraudulent transactions.

Additionally, card present transactions can lead to compromised payment cards at merchant locations and ATMs. The compromised payment cards can then be used for future fraudulent transactions at other locations. For example, an employee steals credit card information and uses that stolen credit card information to perform fraudulent transactions. Additionally, while the compromise may only occur at Merchant A, the subsequent fraudulent transactions may be transacted with multiple different merchants. Determining the source of the breaches can be difficult. Furthermore, additional payment card accounts that also may have been breached at Merchant A are difficult to identify.

BRIEF DESCRIPTION OF THE DISCLOSURE

In one aspect, a computer-implemented method for enhancing fraud detection based on transactions at potentially compromised locations is provided. The method is implemented using a fraud location analyzing computer device in communication with a memory. The method includes determining by the fraud location analyzing computer device a list of potentially compromised transaction locations, storing in the memory the list of potentially compromised transaction locations, and receiving from a first transaction location a first authorization request message for a first transaction. The first authorization request message is associated with a first payment account. The method also includes determining by the fraud location analyzing computer the first transaction location based on the first authorization request message, determining by the fraud location analyzing computer device if the first transaction location is in the list of potentially compromised transaction locations, and if the determination is that the first transaction location is included in the list of potentially compromised transaction locations, flagging the first payment account as potentially compromised so that a fraud score for a future transaction is associated with the first payment account is adjusted based on the potentially compromised flag.

In another aspect, a fraud location analyzing computer device used to enhance fraud detection based on transactions at potentially compromised locations is provided. The fraud location analyzing computer device comprising a processor communicatively coupled to a memory device. The processor is programmed to determine a list of potentially compromised transaction locations, store the list of potentially compromised transaction locations, and receive a first authorization request message for a first transaction at a first transaction location. The first authorization request message is associated with a first payment account. The processor is also programmed to determine the first transaction location based on the first authorization request message, determine if the first transaction location is in the list of potentially compromised transaction locations, and if the determination is that the first transaction location is included in the list of potentially compromised transaction locations, flag the first payment account as potentially compromised so that a fraud score for a future transaction is associated with the first payment account is adjusted based on the potentially compromised flag.

In a further aspect, at least one non-transitory computer-readable storage media having computer-executable instructions embodied thereon is provided. When executed by an actual geographic location analyzer computer device having at least one processor coupled to at least one memory device, the computer-executable instructions cause the processor to determine a list of potentially compromised transaction locations, store the list of potentially compromised transaction locations, and receive a first authorization request message for a first transaction at a first transaction location. The first authorization request message is associated with a first payment account. The computer-executable instructions also cause the processor to determine the first transaction location based on the first authorization request message, determine if the first transaction location is in the list of potentially compromised transaction locations, and if the determination is that the first transaction location is included in the list of potentially compromised transaction locations, flag the first payment account as potentially compromised so that a fraud score for a future transaction is associated with the first payment account is adjusted based on the potentially compromised flag.

BRIEF DESCRIPTION OF THE DRAWINGS

FIG. 1 is a schematic diagram illustrating an example multi-party transaction card industry system for enabling payment-by-card transactions in which merchants and card issuers do not need to have a one-to-one special relationship.

FIG. 2 is a simplified block diagram of an example system used for enhancing fraud detection based on transactions at potentially compromised transaction locations in accordance with one example embodiment of the present disclosure.

FIG. 3 illustrates an example configuration of a client system shown in FIG. 2, in accordance with one embodiment of the present disclosure.

FIG. 4 illustrates an example configuration of a server system shown in FIG. 2, in accordance with one embodiment of the present disclosure FIG. 5 is a schematic view of potential interactions between a plurality of cardholders and a plurality of merchants in accordance with the system shown in FIG. 2.

FIG. 6 is a graphical timeline of the interactions between a merchant and a plurality of cardholders as shown in FIG. 5.

FIG. 7 is a flow chart of a process of generating a list of potentially compromised transaction locations using the system shown in FIG. 2.

FIG. 8 is a flow chart of a process of processing transactions using the list of potentially compromised transaction locations generated by process shown in FIG. 7.

FIG. 9 is a diagram of components of one or more example computing devices that may be used in system shown in FIG. 2.

Figure 1:
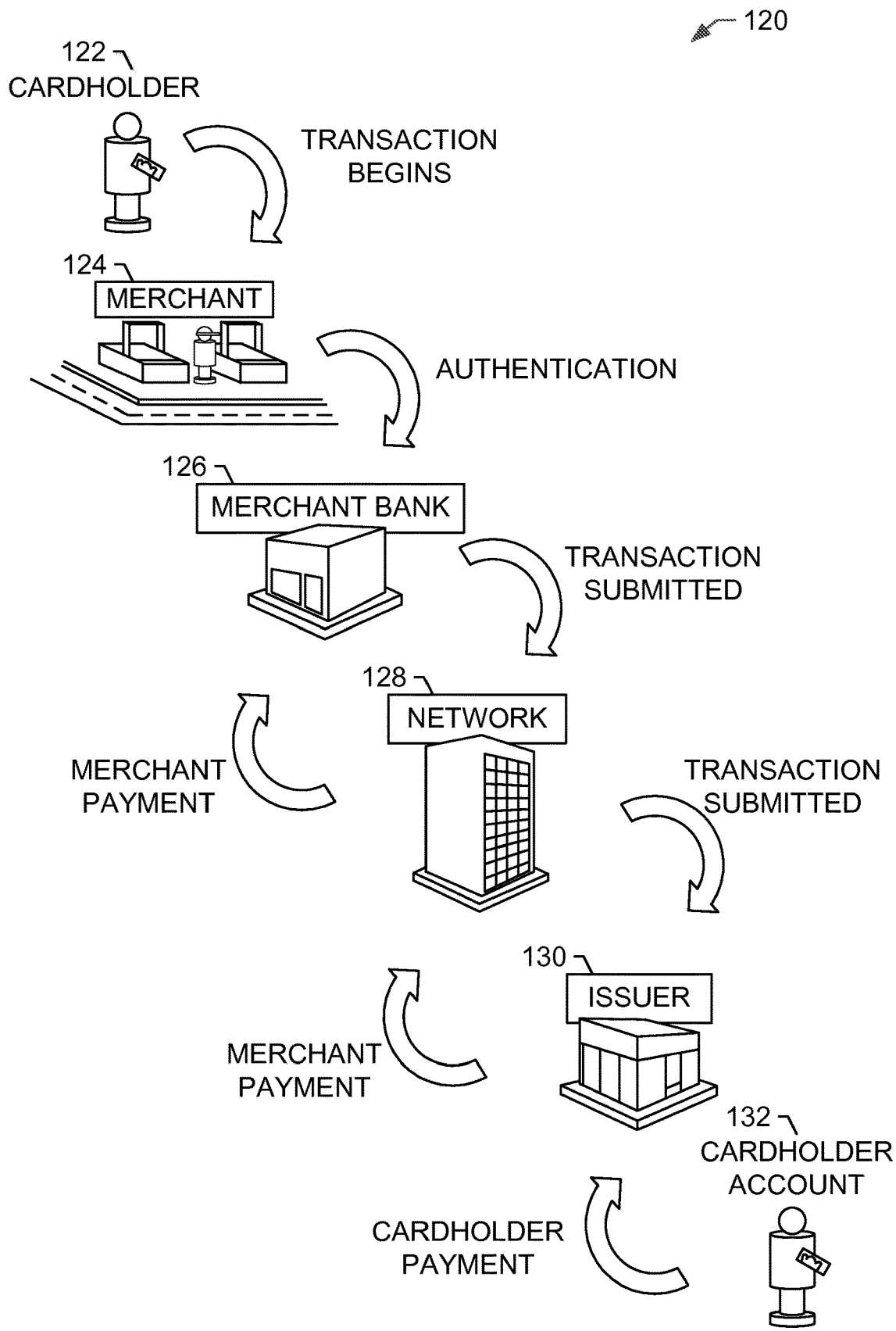
FIGS. 1-9 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

A payment card processing network receives a plurality of payment transactions for processing. The processing network stores these payment transactions in a database. A fraud location analyzer ("FLA") computer device is in communication with the payment network database. The FLA computer device determines a list of compromised payment accounts where fraudulent transactions have been detected. For each payment account on the list of compromised payment accounts, the FLA computer device retrieves from the payment processing network a plurality of payment transactions that occurred before the fraudulent transaction. The FLA computer device aggregates the retrieved payment transactions to determine common transaction locations, such as merchants, that the different compromised payment accounts transacted with prior to reporting fraudulent transactions. Each common transaction location is given a confidence score based on the likelihood that that the transaction location was breached and caused the later fraudulent transactions. If a transaction location's confidence score exceeds a predetermined threshold (e.g., >95%), the FLA computer device adds the transaction location to a potentially compromised list.

When the FLA computer device receives an authorization request message, the FLA computer device compares the originating transaction location associated with the authorization request message to the potentially compromised list. If the originating transaction location matches an entry in the potentially compromised list, then the FLA computer device flags the payment account associated with the authorization request message as potentially compromised. In any future transaction that the flagged payment account performs, the FLA computer device adjusts the fraud score of the future transaction to indicate that the payment account transacted at a potentially compromised merchant. In the example embodiment, the FLA computer device receives the authorization request message while the transaction is processing. In other embodiments, the FLA computer device receives a plurality of transaction data for a plurality of transaction that occurred over a period of time (e.g., over the previous day).

In some embodiments, a transaction location is notified when the transaction location is placed on the potentially compromised list. In other embodiments, the potentially compromised list is updated on a regular basis to keep the list of potentially compromised transaction locations as current as possible. A transaction location can be, but is not limited to, an individual merchant location, an online store, or an ATM.

The methods and systems described herein may be implemented using computer programming or engineering techniques including computer software, firmware, hardware, or any combination or subset. As disclosed above, at least one technical problem with known systems is that there is no efficient way to determine where payment account breaches might have occurred and further to adjust fraud scoring of payment accounts that transact with potentially breached transaction locations. The systems and methods described herein address that technical problem. The technical effect of the systems and processes described herein is achieved by performing at least one of the following steps: (a) determining a list of potentially compromised locations; (b) determining a plurality of compromised payment accounts, wherein each compromised payment account is associated with at least one fraudulent transaction; (c) receiving for each of the plurality of compromised payment account historical transaction data including a plurality of payment transactions conducted by the corresponding compromised payment account within a predetermined period of time prior to the payment account's at least one fraudulent transaction; (d) determining one or more common transaction locations based on the plurality of compromised payment accounts and the historical data where each compromised payment account conducted at least one payment transaction with one of the one or more common transaction locations; (e) determining a first number of payment accounts that transacted with an individual transaction location; (f) determining a second number of payment accounts that reported fraudulent transactions after transacting with the individual transaction location; (g) calculating a confidence score that the individual transaction location is potentially compromised based on the first number and the second number; (h) comparing a plurality of confidence scores for a plurality of transaction locations; (i) adjusting each confidence score based on the comparison; (j) adding the determined one or more common transaction locations to the list of potentially compromised transaction locations; (k) flagging as potentially compromised each payment account that transacted with the one or more determined transaction locations based on the historical transaction data; (l) receiving from a first transaction location a first authorization request message for a first transaction, the authorization request message associated with a first payment account; (l) determining that the first transaction location is on the list of potentially compromised transaction locations; (n) flagging the first payment account as potentially compromised so that a fraud score for a future transaction associated with the first payment account is adjusted based on the potentially compromised flag; (o) receiving from a second transaction location a second authorization request message for a second transaction associated with the first payment account; (p) determining that a potentially compromised flag is associated with the first payment account; and (q) calculating a fraud score for the second transaction based, at least in part, on the potentially compromised flag associated with the first payment account. The resulting technical effect is that more accurate fraud scoring is captured by including whether or not the payment account transacted at a potentially compromised transaction location. An additional technical effect is that potentially compromised transaction locations are quickly and efficiently identified.

Described herein are computer systems such as FLA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to detecting potentially compromised locations and updating the fraud scoring of payment cards that conduct transactions at those potentially compromised locations.

FIG. 1 is a schematic diagram illustrating an example multi-party transaction card industry system 120 for enabling payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128 (also known as a payment network), computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
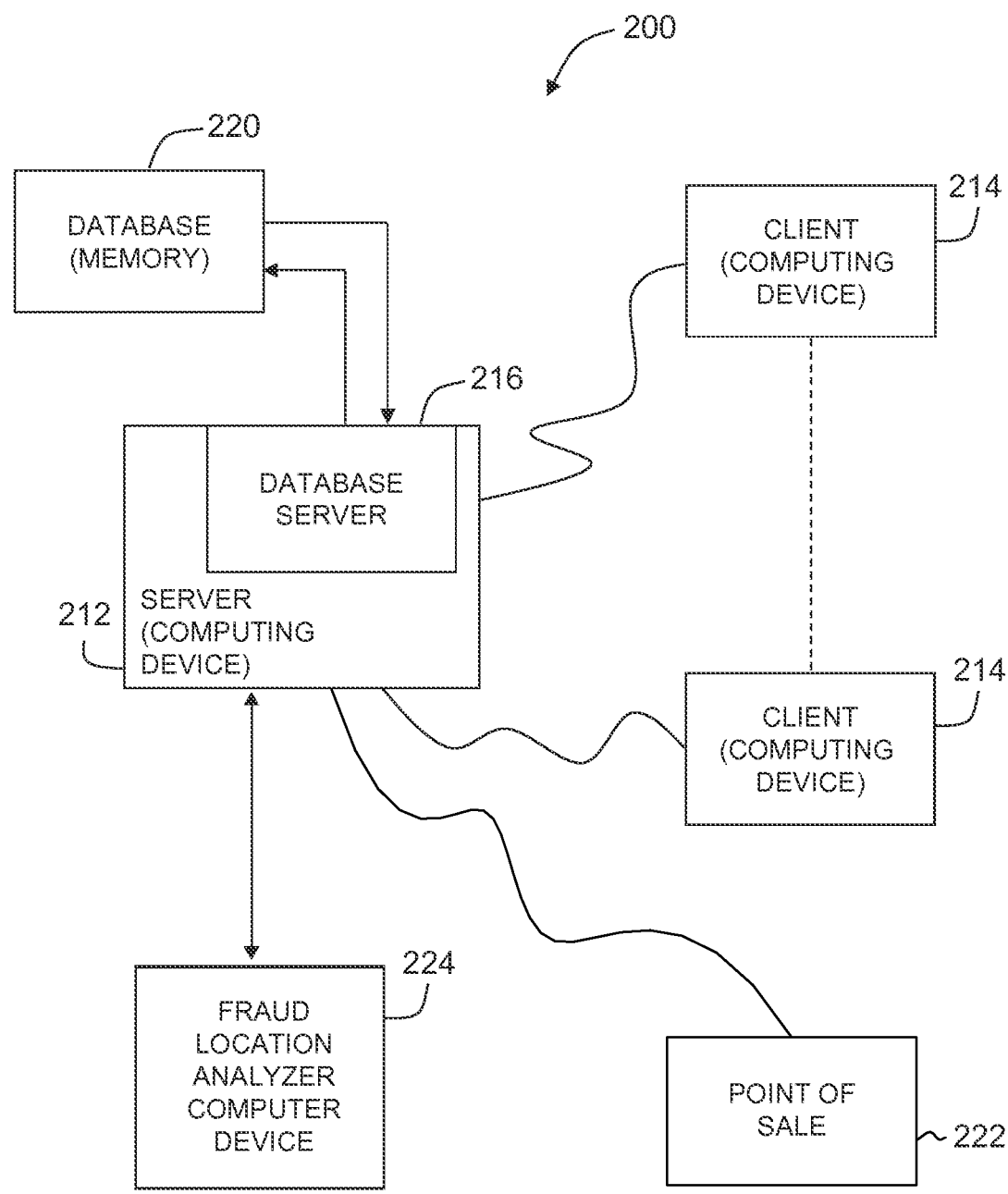

FIG. 2 is a simplified block diagram of an example system 200 used for enhancing fraud detection based on transactions at potentially compromised transaction locations in accordance with one example embodiment of the present disclosure. In the example embodiment, system 200 may be used for processing cardholder transactions. In addition, system 200 is a payment processing system that includes a fraud location analyzer ("FLA") computer device 224 configured to determine potentially compromised transaction locations and adjust the fraud scoring of payment accounts who transacted with those potentially compromised transaction locations. As described below in more detail, FLA computer device 224 is configured to store a list of potentially compromised transaction locations, receive an authorization request message for a first transaction at a first transaction location, determine that the first transaction location is on the list of potentially compromised transaction locations, and flag the first payment account as potentially compromised.

In the example embodiment, client systems 214 are computers that include a web browser or a software application, which enables client systems 214 to access server system 212 using the Internet. More specifically, client systems 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes flagged accounts, a list of potentially compromised transaction locations, compromised accounts, and historical transaction data. In the example embodiment, database 220 is stored remotely from server system 212. In some embodiments, database 220 is decentralized. In the example embodiment, a person can access database 220 via client systems 214 by logging onto server system 212, as described herein.

FLA computer device 224 is communicatively coupled with server system 212. FLA computer device 224 can access server system 212 to store and access data and to communicate with the client systems 214 through server system 212. In some embodiments, FLA computer device 224 may be associated with, or is part of payment system 120, or in communication with payment card system 120, shown in FIG. 1. In other embodiments, FLA computer device 224 is associated with a third party and is merely in communication with the payment card system 120. In some embodiments, FLA computer device 224 may be associated with, or be part of merchant bank 126, interchange network 128, and issuer bank 130, all shown in FIG. 1.

One or more point of sale systems 222 are communicatively coupled with server system 212. The one or more point of sale systems 222 can be merchants 124 shown in FIG. 1, where point of sale systems 222 are communicatively coupled with server system 212 through the payment card system 120. In the example embodiment, point of sale systems 222 may be, but are not limited to, machines that accept card swipes, online payment portals, or stored payment card numbers for recurring transactions.

In some embodiments, server system 212 may be associated with a financial transaction interchange network 128 shown in FIG. 1, and may be referred to as an interchange computer system. Server system 212 may be used for processing transaction data and analyzing for fraudulent transactions. In addition, at least one of client systems 214 may include a computer system associated with an issuer of a transaction card. Accordingly, server system 212 and client systems 214 may be utilized to process transaction data relating to purchases a cardholder 122 (shown in FIG. 1) makes utilizing a transaction card processed by the interchange network 128 and issued by the associated issuer 130. At least one client system 214 may be associated with a user or a cardholder seeking to register, access information, or process a transaction with at least one of the interchange network, the issuer, or the merchant. In addition, client systems 214 or point of sales devices 222 may include point-of-sale (POS) devices associated with a merchant and used for processing payment transactions. At least one client system 214 may be used for investigating potential breaches.

Figure 3:
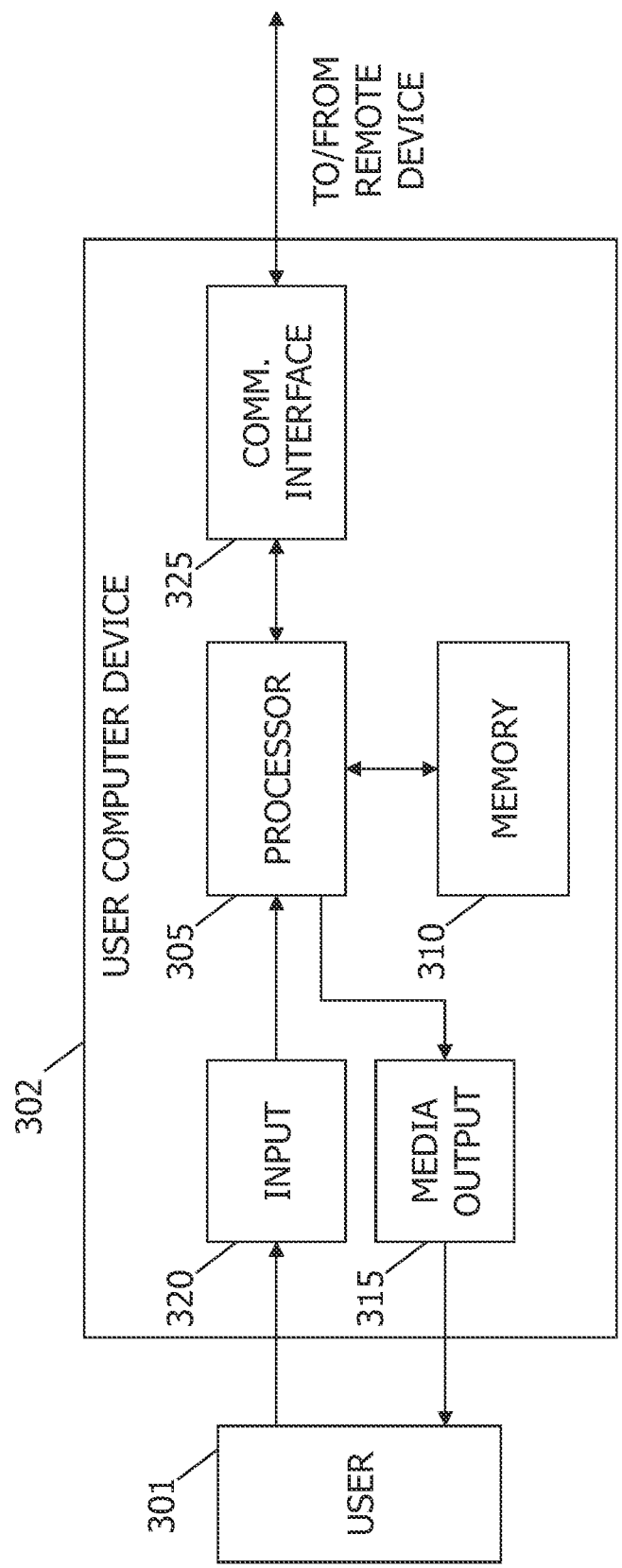

FIG. 3 illustrates an example configuration of client system 214 shown in FIG. 2, in accordance with one embodiment of the present disclosure. User computer device 302 is operated by a user 301. User computer device 302 may include, but is not limited to, client systems 214 and FLA computer device 224 (both shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. The output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 7:
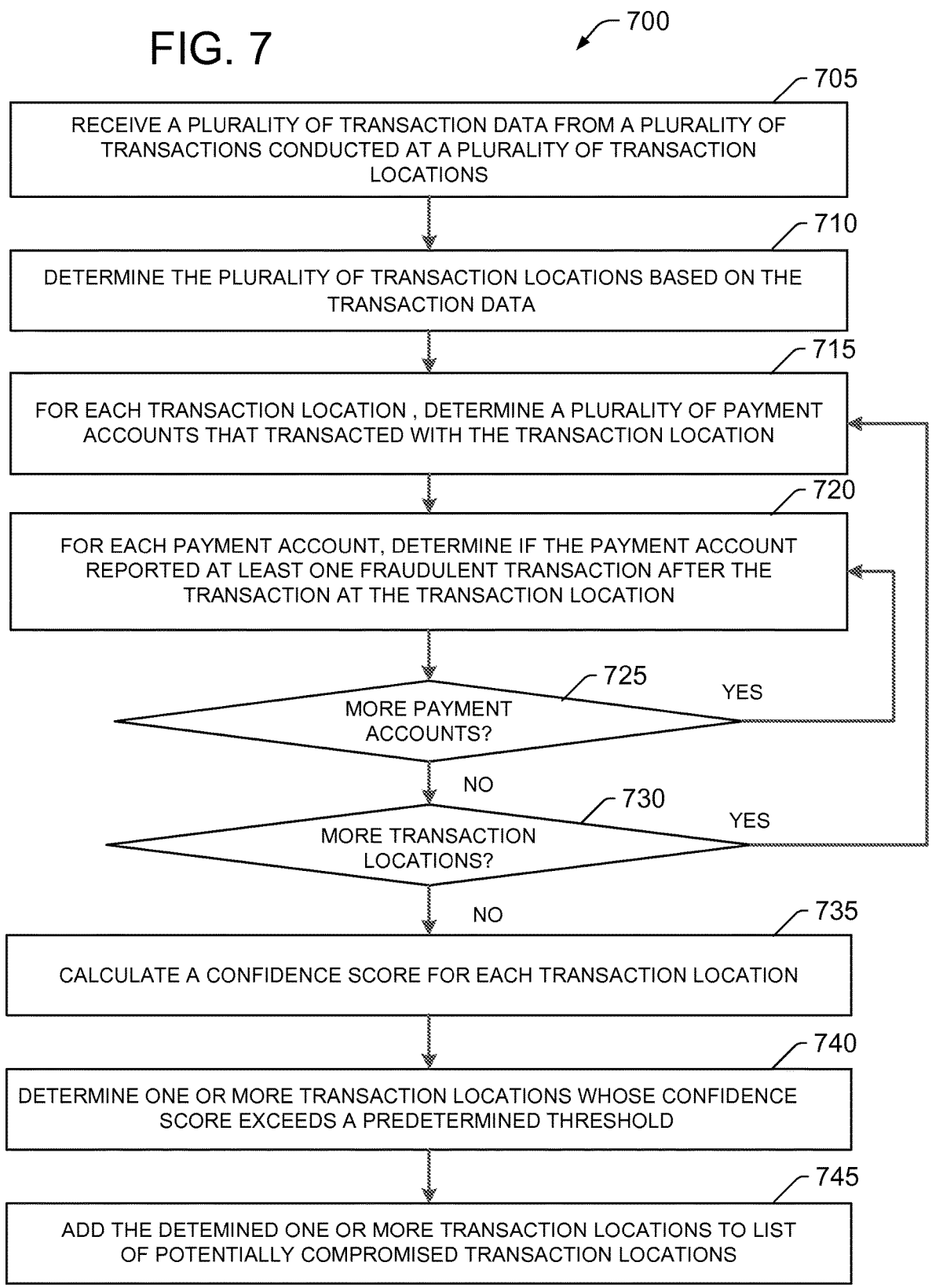
Figure 8:
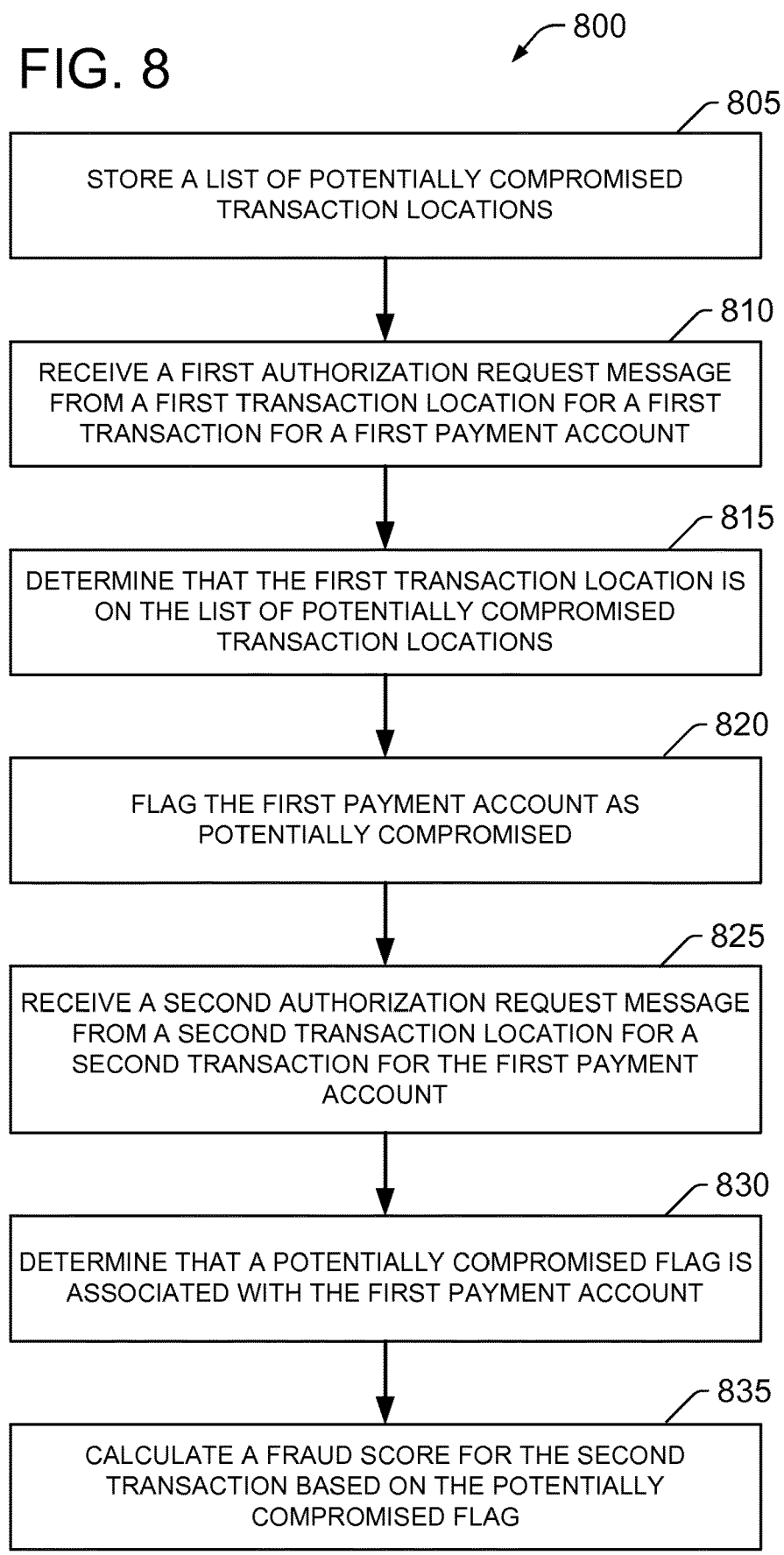

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with instruction such as illustrated in FIGS. 7 and 8.

Figure 4:
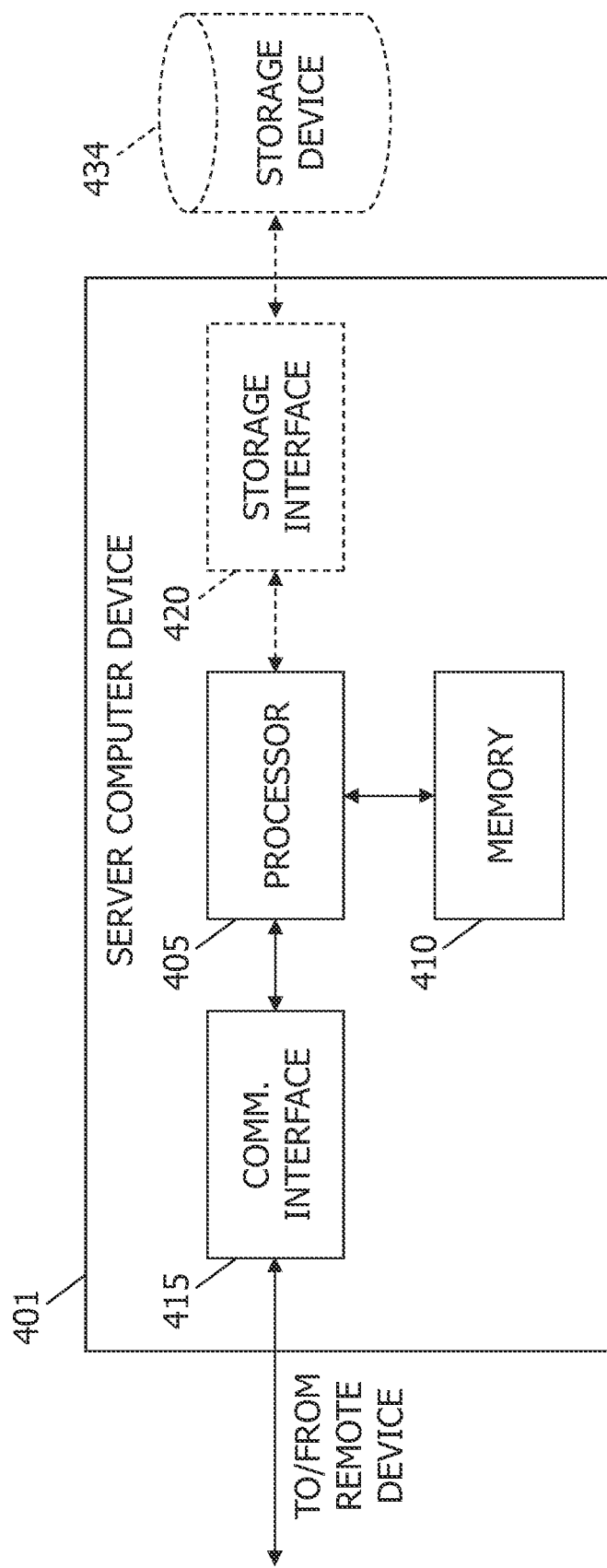

FIG. 4 illustrates an example configuration of server system 212 shown in FIG. 2, in accordance with one embodiment of the present disclosure. Server computer device 401 may include, but is not limited to, server system 212 and database server 216 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or FLA computer device 224 (both shown in FIG. 2). For example, communication interface 415 may receive requests from client systems 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220

(shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 5:
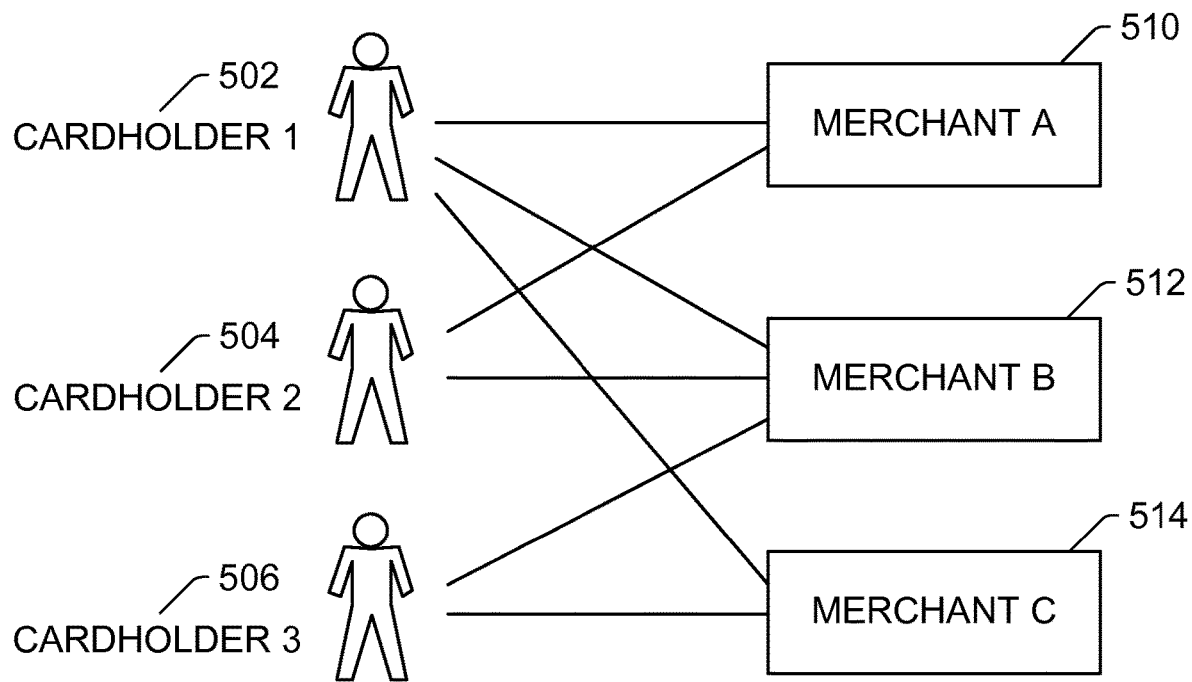

FIG. 5 is a schematic view 500 of potential interactions between a plurality of cardholders and a plurality of merchants in accordance with system 200 shown in FIG. 2. One of the difficulties with detecting breaches of payment card information is that the breach usually occurs at a different transaction location as where the fraudulent transactions occur. Transaction locations include, but are not limited to merchant physical locations, online webstores, and ATMs. For example, an employee steals payment card information for a plurality of transactions that occurred where the employee works. Then the employee fraudulently uses that stolen payment card information at other transaction locations. By correlating the fraudulent transactions with the transaction locations visited by the payment card accounts prior to those fraudulent transactions, the source of the breach may be determined.

Different cardholders may visit different merchants (also known as transaction locations) or the same merchant in different orders. This variety complicates determining where a breach may have occurred. There are many different situations that may occur, so determining where a breach may have occurred is complicated. As shown in schematic view 500, a first cardholder 502 visits a merchant A 510, a merchant B 512, and a merchant C 514. A second cardholder 504 visits merchant A 510 and merchant B 512. A third cardholder 506 visits merchant B 512 and merchant C 514.

In a first example, if second cardholder 504 later reports fraudulent transactions, then a breach could have occurred at merchant A 510 or merchant B 512. If first cardholder 502 and third cardholder 506 also report fraudulent transactions, it is more likely that the breach occurred at merchant B 512 than at merchant A 510, since third cardholder 506 did not transact with merchant A 510. If only first cardholder 502 reports fraudulent transactions, then it is more likely that the breach occurred at merchant A 510. However, there is still a possibility that merchant B 512 was compromised and third cardholder's information was stolen and just not used in a fraudulent transaction yet. Additionally, both merchant A 510 and merchant B 512 could have been breached.

In a second example, first cardholder 502 and third cardholder 506 report later fraudulent transactions, while second cardholder 504 does not. The highest likelihood is that the merchant C 514 was compromised. However, there is a possibility that merchant B 512 was compromised and second cardholder 504 will report fraudulent transactions in the future. Or that merchant A 510 and merchant C 514 were both compromised and second cardholder's information was either not taken or second cardholder 504 will report fraudulent transactions in the future. These examples only display three merchants and three cardholders. As the number of cardholders that transact with each merchant increases, the complexity of determining which merchant might be source of the breach is increased.

Figure 6:
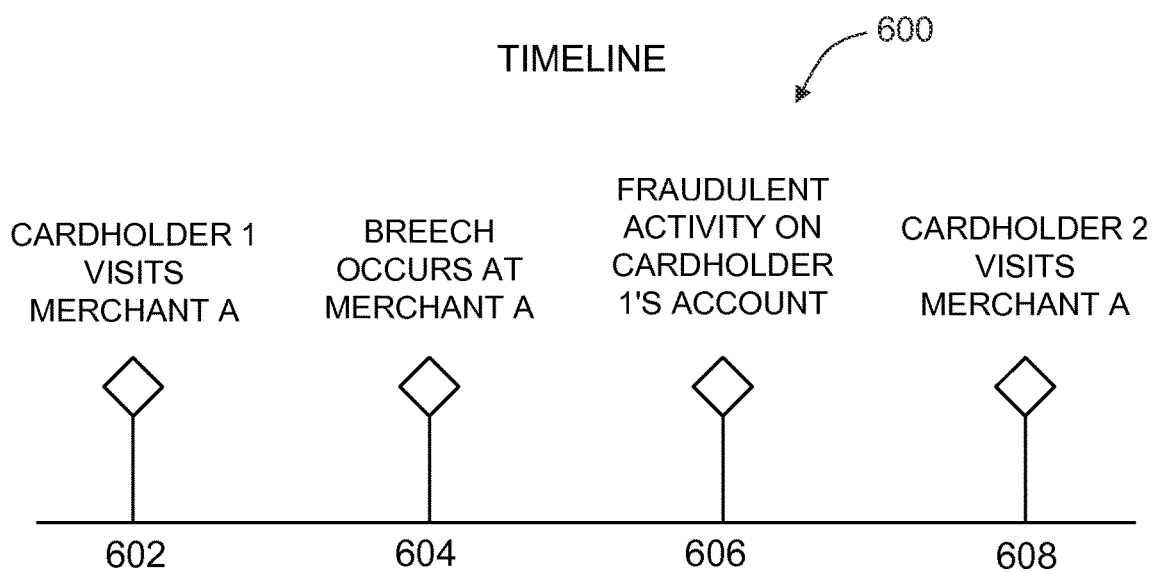

FIG. 6 is a graphical timeline 600 of the interactions between a merchant and a plurality of cardholders as shown in FIG. 5. First cardholder 502 visits 602 merchant A 510 (both shown in FIG. 5). Later a breach occurs 604 at merchant A 510. Fraudulent activity is detected 606 on first cardholder's account. Based on the fraudulent activity on first cardholder's account, merchant A 510 is determined to be a potentially compromised transaction location. Second cardholder 504 (shown in FIG. 5) visits 608 merchant A 510. In the example embodiment, since there is a breach at merchant A 510, then second cardholder's information may have been stolen. Therefore, second cardholder's account should be flagged as potentially compromised for visiting breached merchant A 510.

The potentially compromised flag allows payment card system 120 (shown in FIG. 1) to adjust the fraud scoring of future transactions of second cardholder 504. In some embodiments, the potentially compromised flag will cause the fraud score to be calculated using additional variables. In other embodiments, the potentially compromised flag will adjust the fraud model or fraud rules that are used in calculating the fraud score. The potentially compromised flag is considered a potential predictor or trigger of future fraud.

FIG. 7 is a flow chart of a process 700 of generating a list of potentially compromised transaction locations using system 200 shown in FIG. 2. In the example embodiment, process 700 is performed by FLA computer device 224 (shown in FIG. 2).

FLA computer device 224 receives 705 a plurality of transaction data for a plurality of transactions performed at a plurality of transaction locations. In the example embodiment, each of the transactions includes at least a payment account identifier, a transaction location, and a transaction date and time. FLA computer device 224 determines 710 the plurality of transaction locations from the plurality of transaction data. For each transaction location of the plurality of transaction locations, FLA computer device 224 identifies 715 a plurality of payment accounts that transacted with the transaction location, within a predetermined period of time. For example, the predetermined period of time may be a week or a month period of time. For each identified payment account, FLA computer device 224 determines 720 if the identified payment account reported at least one fraudulent transaction after visiting the transaction location. FLA computer device 224 determines 725 if there are more identified payment accounts. If there are more identified payment accounts, then FLA computer device 224 returns to Step 720. Otherwise FLA computer device 224 determines 730 if there are more transaction locations to analyze. If there are more transaction locations, then FLA computer device 224 returns to Step 715. Otherwise FLA computer device 224 calculates 735 a confidence score for each transaction location.

In the example embodiment, to calculate 735 a confidence score FLA computer device 224 determines a number of visitors to the transaction location during a first time period. FLA computer device 224 determines a number of visitors that reported fraudulent transactions after visiting the transaction location during the first time period. FLA computer device 224 calculates the ratio of visitors with fraud reported to number of visitors. FLA computer device 224 determines a number of visitors for a second time period, a number of visitors with fraud reports for the second time period, and a second ratio. The first time period is before the second time period. For example, the first time period is week 1, and the second time period is week 2. FLA computer device 224 calculates 735 the confidence score for each transaction location using the following z-score equation:

$$Z=1-((p1-p2)/SE) \qquad \text{Eq. (1)}$$

where p1 is the ratio during the first time period, p2 is the proportion in the second time period, and SE is the standard error of the sampling distribution.

Using the calculated confidence score, FLA computer device 224 determines 740 one or more merchants whose confidence score exceeds a predetermined threshold. In the example embodiment, the predetermined threshold is where the z-score is less than 0.05 (i.e., the transaction location has a confidence score of 95%). FLA computer device 224 adds 745 the one or more determined transaction locations to a list of potentially compromised locations. In one embodiment, the list of potentially compromised locations is generated from scratch on a regular basis, e.g., every week. In other embodiments, potentially compromised transaction locations are added to a pre-existing list. In still other embodiments, potentially compromised transaction locations are removed from the list based on, for example, changes in the associated confidence score or length of time since the transaction location was added to the list.

FIG. 8 is a flow chart of a process 800 of processing transactions using the list of potentially compromised transaction locations generated by process 700 shown in FIG. 7. In the example embodiment, process 800 is performed by FLA computer device 224 (shown in FIG. 2).

FLA computer device 224 stores 805 a list of potentially compromised transaction locations. In the example embodiment, the list of potentially compromised transaction locations is generated through process 700. FLA computer device 224 receives 810 a first authorization request message from a first transaction location for a first transaction for a first payment account from payment network 120 (shown in FIG. 1). In the example embodiment, FLA computer device 224 receives the first authorization request message while the corresponding transaction is processing with payment network 120. FLA computer device 224 determines 815 that the first transaction location is on the list of potentially compromised transaction locations. FLA computer device 224 flags 820 the first payment account as potentially compromised based on the first transaction location being on the list of potentially compromised transaction locations. At a later time, FLA computer device 224 receives 825 a second authorization request message from a second transaction location for a second transaction for the first payment account. FLA computer device 224 determines 830 that the first payment account has potentially compromised flag associated with it. FLA computer device 224 calculates 835 a fraud score for the second transaction based, at least in part, on the potentially compromised flag.

While in the example embodiment, process 800 is performed by FLA computer device 224. In additional embodiments, process 800 is performed by server system 212 (shown in FIG. 2) as a part of processing transactions, where server system 212 is a part of payment card system 120 (shown in FIG. 1). Additionally, process 800 may be divided up where Steps 805-820 are performed by FLA computer device 224 and Steps 825-835 are performed by server system 212. In some embodiments, Steps 805-820 may be performed after the first transaction has occurred, while Steps 825-835 are performed in real-time during the processing of the second transaction.

Figure 9:
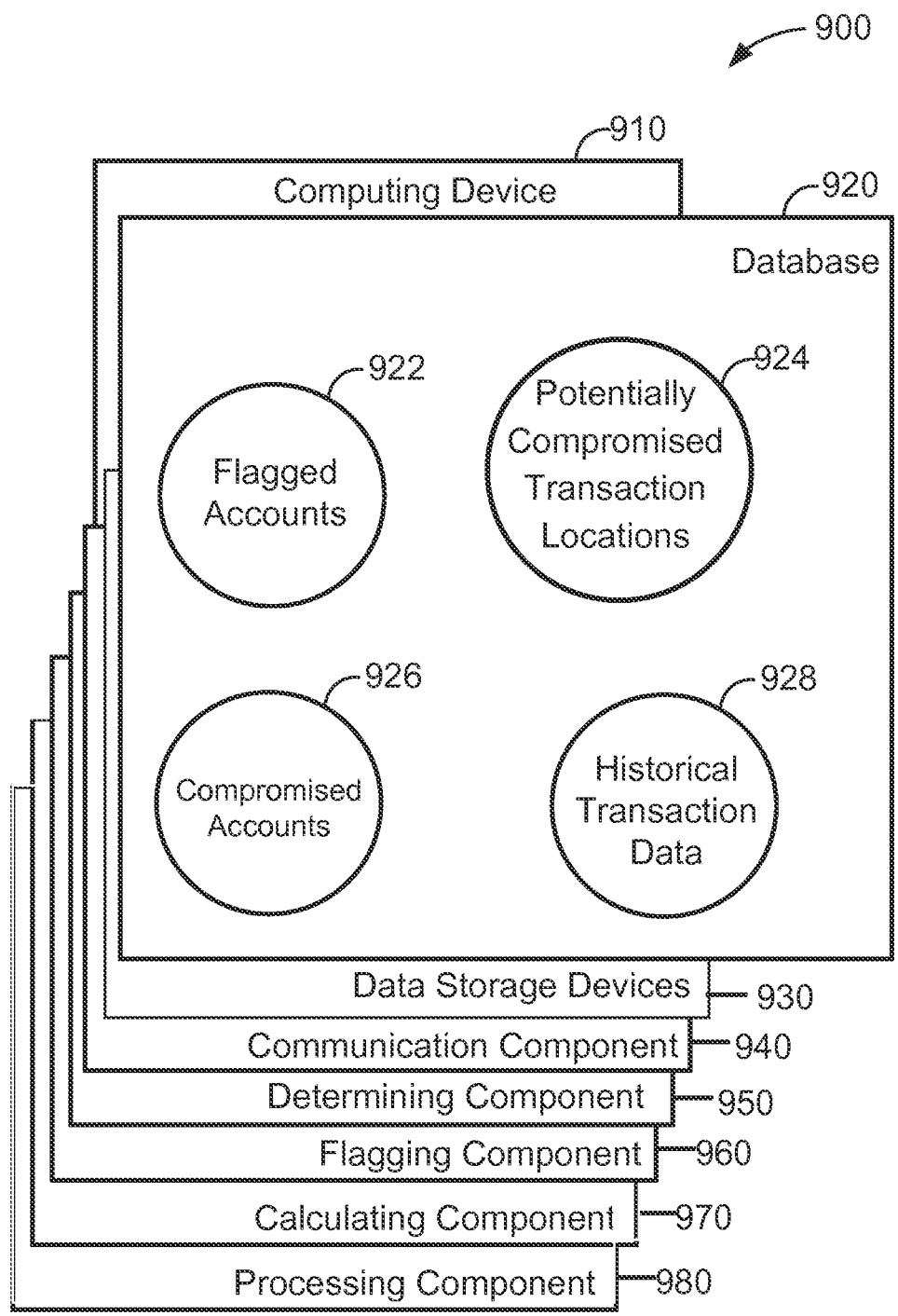

FIG. 9 is a diagram 900 of components of one or more example computing devices that may be used in system 200 shown in FIG. 2. In some embodiments, computing device 910 is similar to server system 212; computing device 910 may also be similar to FLA computer device 224 (both shown in FIG. 2). Database 920 may be coupled with several separate components within computing device 910, which perform specific tasks. In this embodiment, database 920 includes flagged accounts 922, potentially compromised transaction locations 924, compromised accounts 926, and historical transaction data 928. In some embodiments, database 920 is similar to database 220 (shown in FIG. 2).

Computing device 910 includes database 920, as well as data storage devices 930. Computing device 910 also includes a communication component 940 for receiving 810 a first authorization request message and receiving 825 a second authorization request message (both shown in FIG. 8). Computing device 910 also includes a determining component 950 for determining 815 that the first transaction location is on the list of potentially compromised locations and determining 830 that a potentially compromised flag is associated with the first payment account (both shown in FIG. 8). Computing device 910 further includes a flagging component 960 for flagging 820 the first payment account as potentially compromised (shown in FIG. 8). Moreover, computing device 910 includes a calculating component 970 for calculating 835 a fraud score (shown in FIG. 8). A processing component 980 assists with execution of computer-executable instructions associated with the system.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A computer-implemented method for electronically detecting potentially compromised transaction locations, the method implemented using a fraud location analyzing (FLA) computer device in communication with a memory and a payment processing network, the method comprising:

storing, in a database, a plurality of fraud analysis information for a plurality of payment accounts, wherein the plurality of fraud analysis information is used by the payment processing network for generating fraud scores for payment transactions associated with the plurality of payment accounts and submitted over the payment processing network;

retrieving, from the database by the FLA computer device, a plurality of historical transactions associated with the plurality of payment accounts and previously completed using the payment processing network, the plurality of historical transactions including, for each of the plurality of historical transactions, a payment account identifier, a transaction location, and a transaction date;

determining, by the FLA computer device performing a lookup within the retrieved plurality of historical transactions, a plurality of transaction locations included in the retrieved plurality of historical transactions;

identifying, by the FLA computer device, for each of the plurality of transaction locations, a first set of the plurality of payment accounts that transacted with each transaction location within a predetermined period of time;

identifying, by the FLA computer device, for each of the plurality of transaction locations, a second set of the plurality of payment accounts that transacted with each transaction location within the predetermined period of time and subsequently reported a fraudulent transaction;

generating, by the FLA computer device, a list of potentially compromised individual merchants by comparing, for each of the plurality of transaction locations, a number of the payment accounts in the second set of the plurality of payment accounts to a number of the payment accounts in the first set of the plurality of payment accounts;

storing, in the memory, the list of potentially compromised individual merchants;

subsequent to storing the list of potentially compromised individual merchants, receiving, by the FLA computer device from a first transaction location associated with a first transaction, a first authorization request message for the first transaction, the first authorization request message including a first payment account identifier associated with a first payment account, the first payment account not having been reported to either the FLA computer device or the payment processing network as used in a fraudulent transaction, the first authorization request message received via the payment processing network, wherein the first transaction is a payment card transaction between the first payment account and a first merchant, wherein the first authorization request message includes data for authorizing the first transaction and data indicating the first transaction location;

comparing, by the FLA computer device performing a lookup within the memory, the first transaction location to the transaction locations included in the list of potentially compromised individual merchants;

in response to matching the first transaction location to one of the transaction locations based on the comparison, flagging, by the FLA computer device within the database, the first payment account associated with the first transaction location, wherein the flag indicates that the first payment account is potentially compromised;

receiving, by the FLA computer device from a second transaction location associated with a second transaction, a second authorization request message associated with the second transaction, wherein the second transaction is associated with the first payment account and occurs subsequent to the first transaction, and wherein the second transaction location is different from the first transaction location; and adjusting, in real-time by the FLA computer device with respect to receiving the second authorization request message, a fraud score for the second transaction based on the flag of the first payment account in the database, thereby alerting parties to the second transaction to be notified that the second transaction is potentially fraudulent in real-time during processing of the second authorization request message.

2. The method of claim 1, further comprising:

determining a plurality of compromised payment accounts, wherein each compromised payment account is associated with at least one fraudulent transaction;

receiving, for each of the plurality of compromised payment accounts, historical transaction data including a plurality of payment transactions conducted by each of the plurality of compromised payment accounts, the plurality of payment transactions conducted within a first predetermined period of time prior to occurrence of the at least one fraudulent transaction associated with each compromised payment account;

determining one or more common individual merchants based on the plurality of compromised payment accounts and the historical transaction data, each of the plurality of compromised payment accounts conducting at least one payment transaction with one of the one or more common individual merchants; and adding the determined one or more common individual merchants to the list of potentially compromised individual merchants.

3. The method of claim 2, further comprising flagging as potentially compromised each payment account that transacted with the determined one or more common individual merchants based on the historical transaction data.

4. The method of claim 1, wherein generating the list of potentially compromised individual merchants further comprises calculating, by the FLA computer device, a confidence score for each of the plurality of transaction locations.

5. The method of claim 4, wherein calculating the confidence score further comprises:

identifying, by the FLA computer device, for each of the plurality of transaction locations, a third set of the plurality of payment accounts that transacted with each transaction location within a second predetermined period of time, wherein the first predetermined period of time is before the second predetermined period of time;

identifying, by the FLA computer device, for each of the plurality of transaction locations, a fourth set of the plurality of payment accounts that transacted with each transaction location within the second predetermined period of time and subsequently reported a fraudulent transaction; and calculating the confidence score based on a difference between i) a ratio of the number of the payment accounts in the second set of the plurality of payment accounts to the number of the payment accounts in the first set of the plurality of payment accounts, and ii) a number of the payment accounts in the fourth set of the plurality of payment accounts to a number of the payment accounts in the third set of the plurality of payment accounts.

6. The method of claim 4, wherein calculating the confidence score further comprises:
comparing the respective confidence scores for the plurality of transaction locations; and
adjusting each confidence score based on the comparison.

7. The method of claim 1, further comprising updating the list of potentially compromised individual merchants on a periodic basis.

8. The method of claim 1, further comprising notifying a merchant on the list of potentially compromised individual merchants that the merchant is potentially compromised.

9. The method of claim 1, wherein at least one merchant on the list of potentially compromised individual merchants is an Automated Teller Machine (ATM).

10. A fraud location analyzing (FLA) computer device for electronically detecting potentially compromised transaction locations, said FLA computer device comprising a processor communicatively coupled to a memory device, the FLA computer device in communication with a payment processing network, said processor programmed to:
store, in a database, a plurality of fraud analysis information for a plurality of payment accounts, wherein the plurality of fraud analysis information is used by the payment processing network for generating fraud scores for payment transactions associated with the plurality of payment accounts and submitted over the payment processing network;
retrieve, from the database, a plurality of historical transactions associated with the plurality of payment accounts and previously completed using the payment processing network, the plurality of historical transactions including, for each of the plurality of historical transactions, a payment account identifier, a transaction location, and a transaction date;
determine a plurality of transaction locations included in the retrieved plurality of historical transactions by performing a lookup within the retrieved plurality of historical transactions;
identify, for each of the plurality of transaction locations, a first set of the plurality of payment accounts that transacted with each transaction location within a predetermined period of time;
identify, for each of the plurality of transaction locations, a second set of the plurality of payment accounts that transacted with each transaction location within the predetermined period of time and subsequently reported a fraudulent transaction;
generate a list of potentially compromised individual merchants by comparing, for each of the plurality of transaction locations, a number of the payment accounts in the second set of the plurality of payment accounts to a number of the payment accounts in the first set of the plurality of payment accounts;
store, in the memory device, the list of potentially compromised individual merchants;
subsequent to storing the list of potentially compromised individual merchants, receive, from a first transaction location associated with a first transaction, a first authorization request message for the first transaction, the first authorization request message including a first payment account identifier associated with a first payment account, the first payment account not having been reported to either the FLA computer device or the payment processing network as used in a fraudulent transaction, the first authorization request message received via the payment processing network, wherein the first transaction is a payment card transaction between the first payment account and a first merchant, wherein the first authorization request message includes data for authorizing the first transaction and data indicating the first transaction location;
compare the first transaction location to the transaction locations included in the list of potentially compromised individual merchants by performing a lookup within the memory device;
in response to matching the first transaction location to one of the transaction locations based on the comparison, flag, within the database, the first payment account associated with the first transaction location, wherein the flag indicates that the first payment account is potentially compromised;
receive, from a second transaction location associated with a second transaction, a second authorization request message associated with the second transaction, wherein the second transaction is associated with the first payment account and occurs subsequent to the first transaction, and wherein the second transaction location is different from the first transaction location; and
adjust, in real-time with respect to receiving the second authorization request message, a fraud score for the second transaction based on the flag of the first payment account in the database, thereby alerting parties to the second transaction that the second transaction is potentially fraudulent in real-time to during processing of the second authorization request message.

11. A FLA computer device in accordance with claim 10, wherein said processor is further programmed to:
determine a plurality of compromised payment accounts, wherein each compromised payment account is associated with at least one fraudulent transaction;
receive for each of the plurality of compromised payment accounts, historical transaction data including a plurality of payment transactions conducted by each of the plurality of compromised payment accounts, the plurality of payment transactions conducted within a first predetermined period of time prior to occurrence of the at least one fraudulent transaction associated with each compromised payment account;
determine one or more common individual merchants based on the plurality of compromised payment accounts and the historical transaction data, each of the plurality of compromised payment accounts conducting at least one payment transaction with one of the one or more common individual merchants; and
add the determined one or more common individual merchants to the list of potentially compromised individual merchants.

12. A FLA computer device in accordance with claim 11, wherein said processor is further programmed to flag as potentially compromised each payment account that transacted with the determined one or more common individual merchants based on the historical transaction data.

13. A FLA computer device in accordance with claim 10, wherein said processor is further programmed to generate the list of potentially compromised individual merchants by calculating a confidence score for each of the plurality of transaction locations.

14. A FLA computer device in accordance with claim 13, wherein said processor is further programmed to:
identify, for each of the plurality of transaction locations, a third set of the plurality of payment accounts that transacted with each transaction location within a second predetermined period of time, wherein the first predetermined period of time is before the second predetermined period of time;
identify, for each of the plurality of transaction locations, a fourth set of the plurality of payment accounts that transacted with each transaction location within the second predetermined period of time and subsequently reported a fraudulent transaction; and
calculate the confidence score based on a difference between i) a ratio of the number of the payment accounts in the second set of the plurality of payment accounts to the number of the payment accounts in the first set of the plurality of payment accounts, and ii) a number of the payment accounts in the fourth set of the plurality of payment accounts to a number of the payment accounts in the third set of the plurality of payment accounts.

15. A FLA computer device in accordance with claim 13, wherein said processor is further programmed to:
compare the respective confidence scores for the plurality of transaction locations; and
adjust each confidence score based on the comparison.

16. At least one non-transitory computer-readable storage medium having computer-executable instructions embodied thereon, wherein when executed by a fraud location analyzing (FLA) computer device having at least one processor coupled to at least one memory device, the computer-executable instructions cause the processor to:
store, in a database, a plurality of fraud analysis information for a plurality of payment accounts, wherein the plurality of fraud analysis information is used by a payment processing network for generating fraud scores for payment transactions associated with the plurality of payment accounts and submitted over the payment processing network;
retrieve, from the database, a plurality of historical transactions associated with the plurality of payment accounts and previously completed using the payment processing network, the plurality of historical transactions including, for each of the plurality of historical transactions, a payment account identifier, a transaction location, and a transaction date;
determine a plurality of transaction locations included in the retrieved plurality of historical transactions by performing a lookup within the retrieved plurality of historical transactions;
identify for each of the plurality of transaction locations, a first set of the plurality of payment accounts that transacted with each transaction location within a predetermined period of time;
identify for each of the plurality of transaction locations, a second set of the plurality of payment accounts that transacted with each transaction location within the predetermined period of time and subsequently reported a fraudulent transaction;
generate a list of potentially compromised individual merchants by comparing, for each of the plurality of transaction locations, a number of the payment accounts in the second set of the plurality of payment accounts to a number of the payment accounts in the first set of the plurality of payment accounts;
store, in the at least one memory device, the list of potentially compromised individual merchants;
subsequent to storing the list of potentially compromised individual merchants, receive, from a first transaction location associated with a first transaction, a first authorization request message for the first transaction, the first authorization request message including a first payment account identifier associated with a first payment account, the first payment account not having been reported to either the FLA computer device or a payment processing network in communication with the FLA computer device as used in a fraudulent transaction, the first authorization request message received via the payment processing network, wherein the first transaction is a payment card transaction between the first payment account and a first merchant, wherein the first authorization request message includes data for authorizing the first transaction and data indicating the first transaction location;
compare the first transaction location to the transaction locations included in the list of potentially compromised individual merchants by performing a lookup within the at least one memory device;
in response to matching the first transaction location to one of the transaction locations based on the comparison, flag, within the database, the first payment account associated with the first transaction location, wherein the flag indicates that the first payment account is potentially compromised;
receive, from a second transaction location associated with a second transaction, a second authorization request message associated with the second transaction, wherein the second transaction is associated with the first payment account and occurs subsequent to the first transaction, and wherein the second transaction location is different from the first transaction location; and
adjust, in real-time with respect to receiving the second authorization request message, a fraud score for the second transaction based on the flag of the first payment account in the database, thereby enabling parties to the second transaction to be notified that the second transaction is potentially fraudulent in real-time with respect to processing of the second authorization request message.

17. The computer-readable storage medium of claim 16, wherein the computer-executable instructions further cause the processor to:
determine a plurality of compromised payment accounts, wherein each compromised payment account is associated with at least one fraudulent transaction;
receive for each of the plurality of compromised payment accounts, historical transaction data including a plurality of payment transactions conducted by each of the plurality of compromised payment accounts, the plurality of payment transactions conducted within a first predetermined period of time prior to occurrence of the at least one fraudulent transaction associated with each compromised payment account;
determine one or more common individual merchants based on the plurality of compromised payment accounts and the historical transaction data, each of the plurality of compromised payment accounts conducting at least one payment transaction with one of the one or more common individual merchants; and add the determined one or more common individual merchants to the list of potentially compromised individual merchants.

\* \* \* \* \*